United States Patent [19]

Suzuki et al.

[11] Patent Number: 5,220,503
[45] Date of Patent: Jun. 15, 1993

[54] SENTENCE TRANSLATION WITH MANUAL INPUTTING OF PART OF SPEECH INFORMATION BEFORE TRANSLATION

[75] Inventors: Hitoshi Suzuki, Nara; Kouji Miyao, Kashihara; Hazime Asano, Yamatokoriyama; Shinji Tokunaga, Nara; Shuzo Kugimiya; Yasuhiro Takiguchi, both of Yamatokoriyama, all of Japan

[73] Assignee: Sharp Kabushiki Kaisha, Osaka, Japan

[21] Appl. No.: 845,847

[22] Filed: Mar. 6, 1992

Related U.S. Application Data

[63] Continuation of Ser. No. 614,972, Nov. 19, 1990, abandoned, which is a continuation of Ser. No. 777,442, Sep. 18, 1985, abandoned.

[30] Foreign Application Priority Data

| Sep. 18, 1984 | [JP] | Japan | 59-195593 |
| Sep. 26, 1984 | [JP] | Japan | 59-201112 |
| Sep. 26, 1984 | [JP] | Japan | 59-201116 |
| Oct. 5, 1984 | [JP] | Japan | 59-210204 |
| Oct. 5, 1984 | [JP] | Japan | 59-210205 |
| Oct. 8, 1984 | [JP] | Japan | 59-210757 |
| Oct. 8, 1984 | [JP] | Japan | 59-210758 |

[51] Int. Cl.⁵ ............................................. G06F 15/38
[52] U.S. Cl. .................................. 364/419; 364/920.4; 364/226.4
[58] Field of Search .......... 364/419, DIG. 1, DIG. 2, 364/920.4, 226.4; 434/313, 157

[56] References Cited

U.S. PATENT DOCUMENTS

| 4,193,119 | 3/1980 | Arase et al. | 364/900 |
| 4,420,817 | 12/1983 | Yoshida | 364/900 |
| 4,460,973 | 7/1984 | Ianimoto et al. | 364/900 |
| 4,468,754 | 8/1984 | Asada et al. | 364/419 |
| 4,498,149 | 2/1985 | Yoshida | 364/709 |
| 4,502,128 | 2/1985 | Okajima et al. | 364/900 |
| 4,542,478 | 9/1985 | Hashimoto et al. | 364/900 |
| 4,543,631 | 9/1985 | Kurosu et al. | 364/419 |
| 4,594,686 | 6/1986 | Yoshida | 364/419 |
| 4,599,012 | 7/1986 | Kaji et al. | 364/419 |
| 4,641,264 | 2/1987 | Nitta | 364/419 |
| 4,674,065 | 6/1987 | Lange et al. | 364/900 |

FOREIGN PATENT DOCUMENTS

| 0081784 | 6/1982 | European Pat. Off. . |
| 0175074 | 10/1983 | Japan . |
| 0175075 | 10/1983 | Japan . |
| 0090270 | 5/1986 | Japan . |
| 1596411 | 4/1981 | United Kingdom . |

OTHER PUBLICATIONS

WordPerfect 4.0 screen display of "word-in-context" spell checking function, WordPerfect Corp., Orem, Ohio, 1982.

"JS&A Products", language translator, *Scientific American*, Feb. 1979, p. 4.

Primary Examiner—Roy N. Envall, Jr.
Assistant Examiner—A. Bodendorf

[57] ABSTRACT

A translation system performing translation from a first language into a second language under an interaction mode between said translation system and an operator, includes keys for inputting the original sentence to be translated, means for translating the input sentence of said first language into an output sentence of said second language, wherein the operator inputs information relating to at least one word of the input sentence such as the part of speech or the element of the sentence. The translation is then performed on the basis of said input information.

8 Claims, 26 Drawing Sheets

Fig. 3
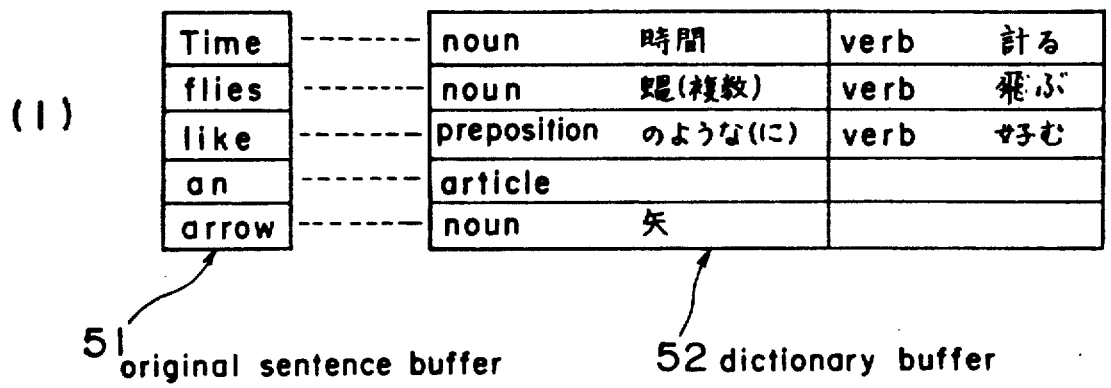
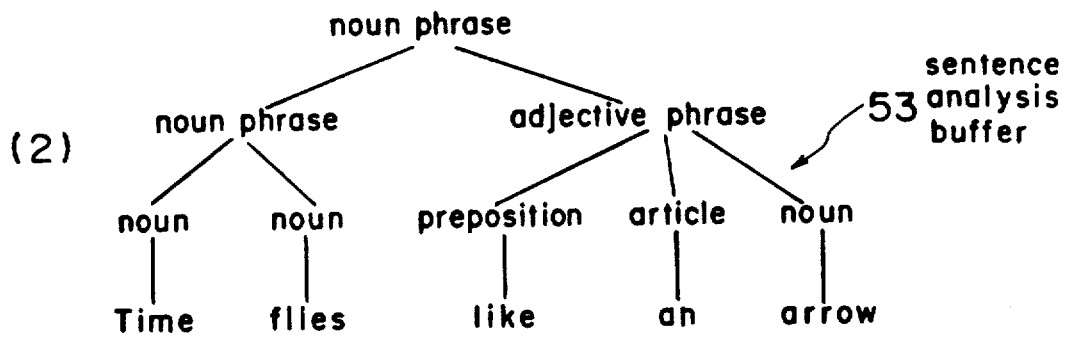
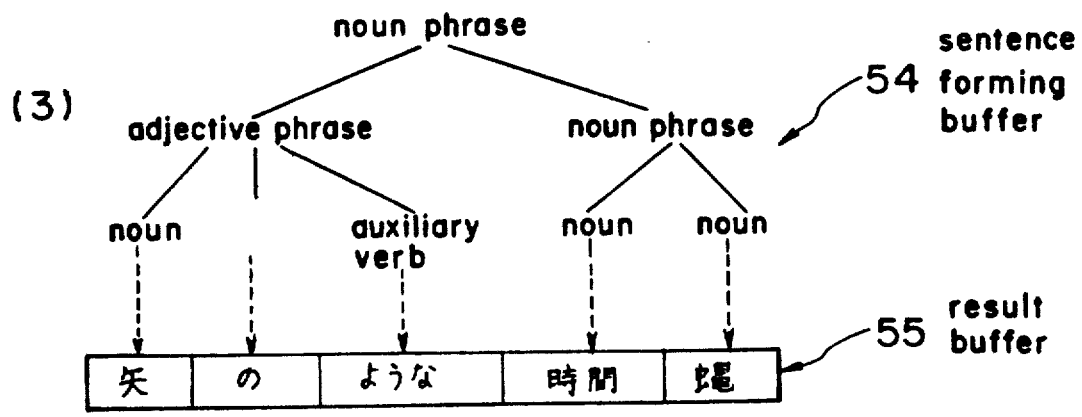

Fig. 4

(1) Time flies like an arrow.

(2) Time flies like an arrow.
矢のような時間蝿

(3) Time flies like an arrow
矢のように蝿を計れ.

Fig. 6

(1)
| Time flies like an arrow. |
| --- |
| noun |
|  |

(2)
| Time flies like an arrow. |
| --- |
| noun |
| 矢のような時間蝿<br>Die Zeit-Fliege sieht aus wie ein pheil |

(3)
| Time flies like an arrow. |
| --- |
| noun |
| 時間蝿は矢を好む<br>Die Zeit-Fliege hat Den Pheil gern. |

(4)
| Time flies like an arrow. |
| --- |
| noun |
| 時間は矢のように飛ぶ。<br>Die Zeit-Fliegt so schnell wil ein Pheil. |

Fig. 7

(1) Time <u>flies</u> like an arrow.
    verb (2) Time <u>flies</u> like an arrow.
    verb
    時間は矢のように飛ぶ。

Fig. 8a (1)
| Time flies like an arrow. |
|---|
|         preposition |
| |

(2)
| Time flies like an arrow. |
|---|
|         preposition |
| 矢のような時間蝿 |

(3)
| Time flies like an arrow. |
|---|
|         preposition |
| 矢のように蝿を計れ。 |

Fig. 8b (4)
| Time flies like an arrow. |
| preposition |
| 矢のような蝿を計れ。 |

(5)
| Time flies like an arrow. |
| preposition |
| 時間は矢のように飛ぶ。 |

Fig. 9
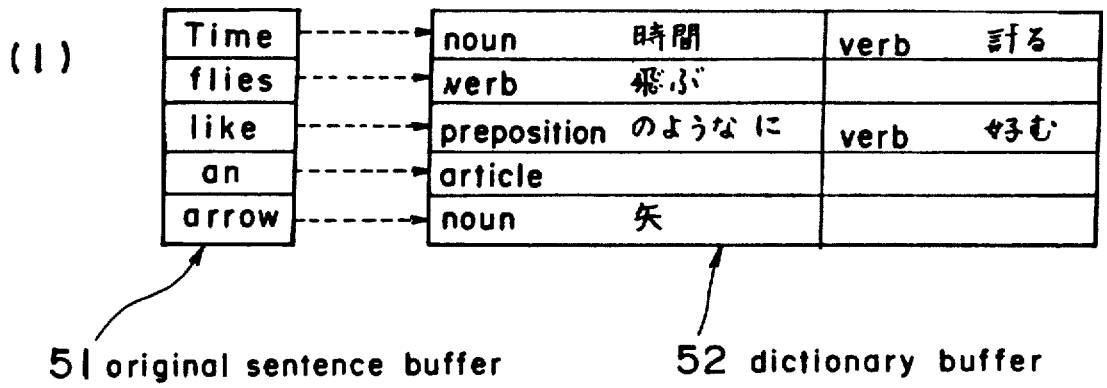
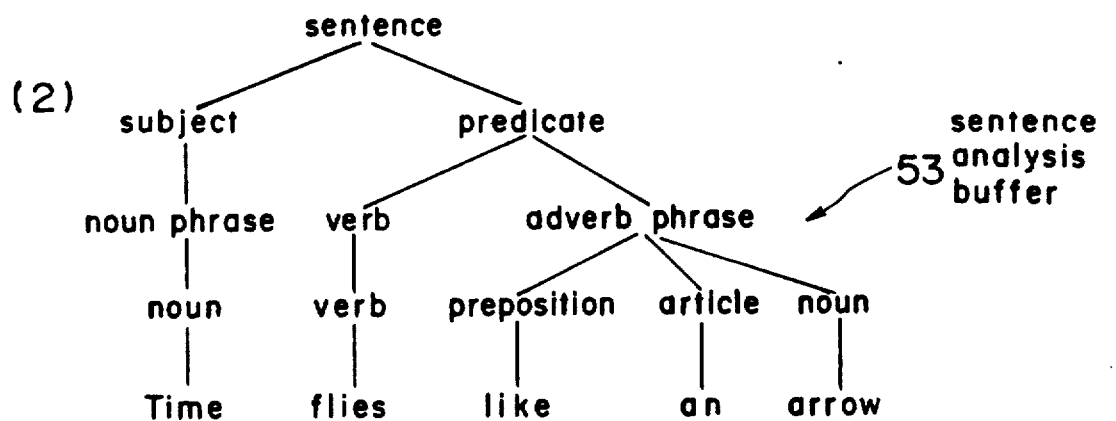
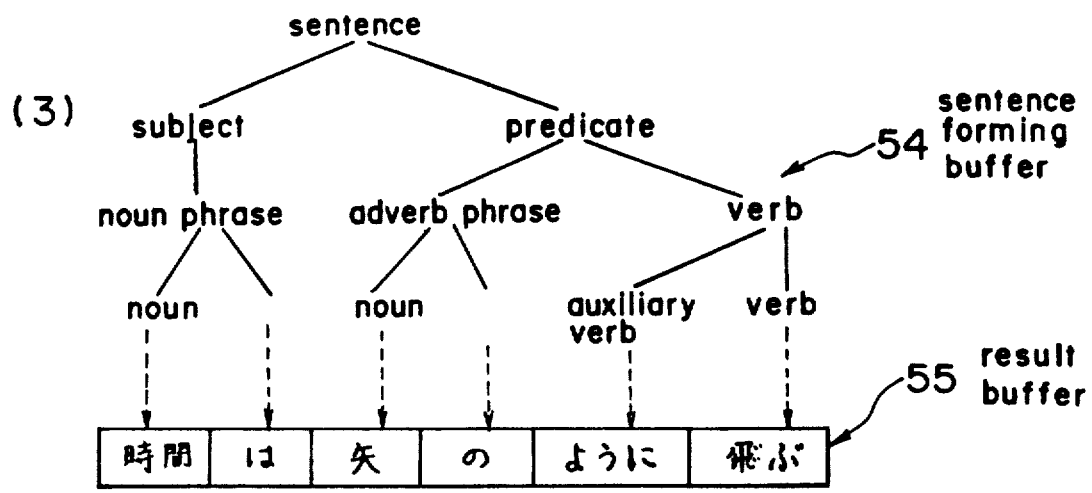

EII : element interelation instruction

SA : sentence analysis

Fig. 11
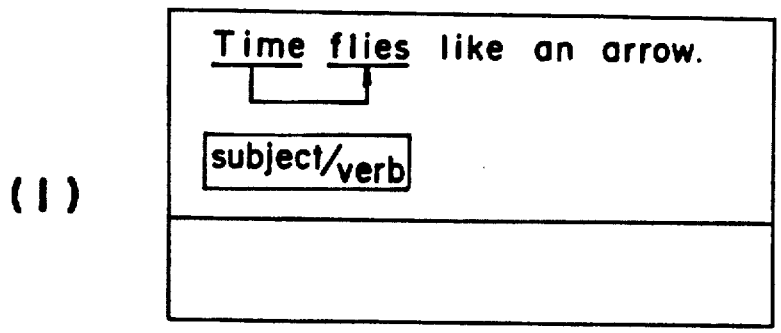
(1)
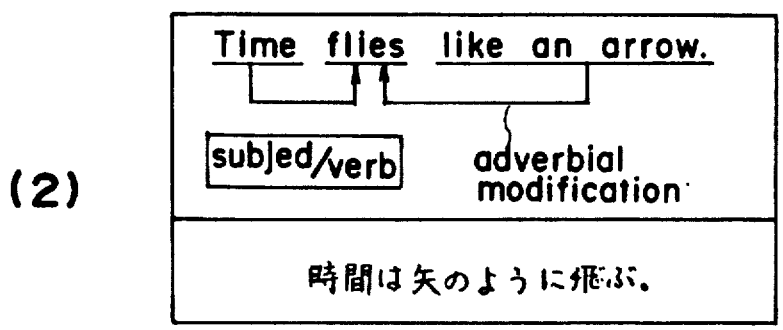
(2)
Fig. 12
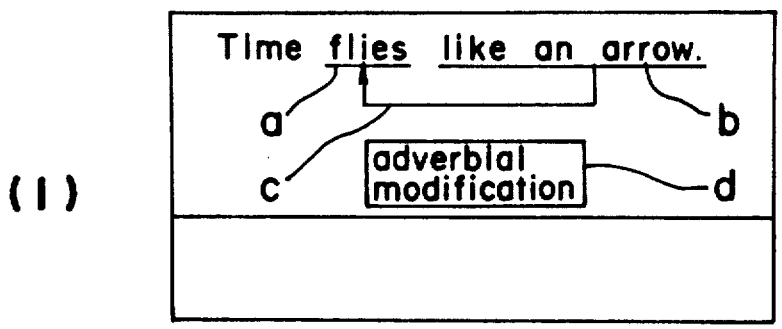
(1)
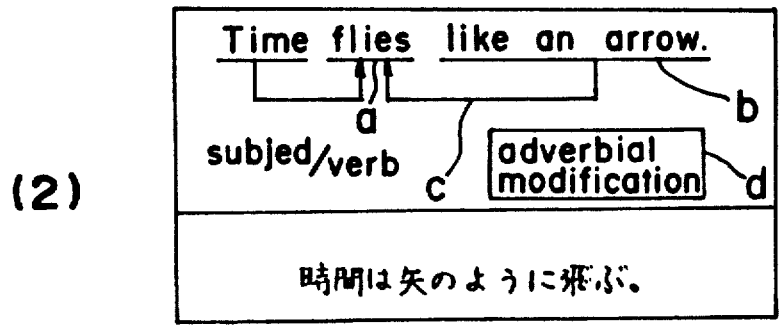
(2)

SEI : sentence element instruction

Fig. 14
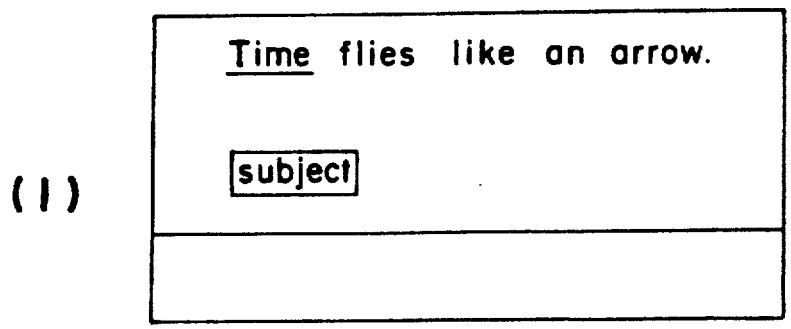
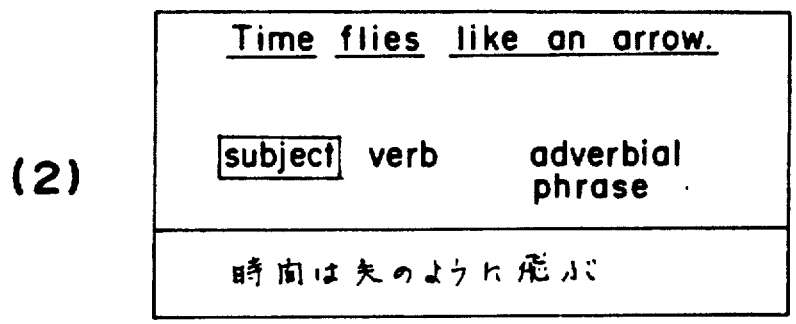
Fig. 15
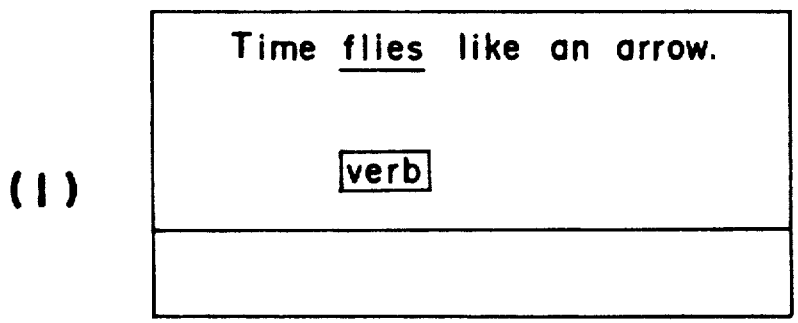
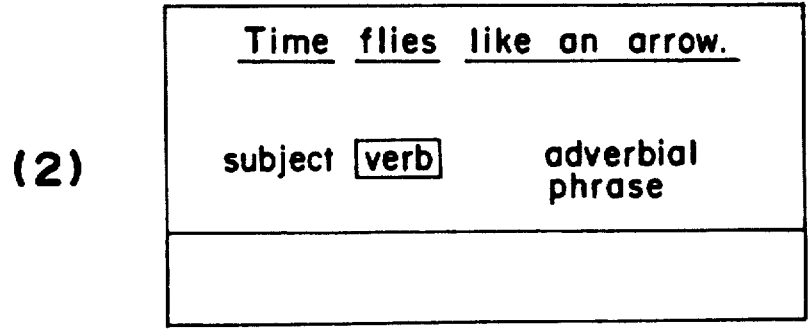

Fig. 16
(1) 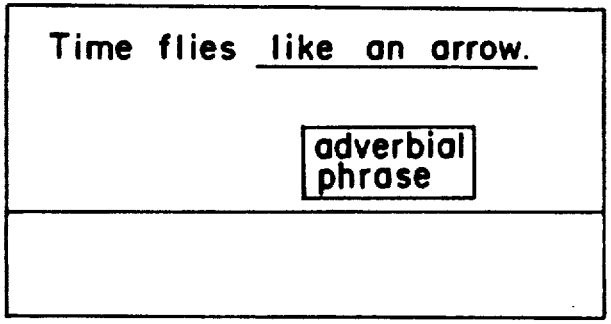
(2) 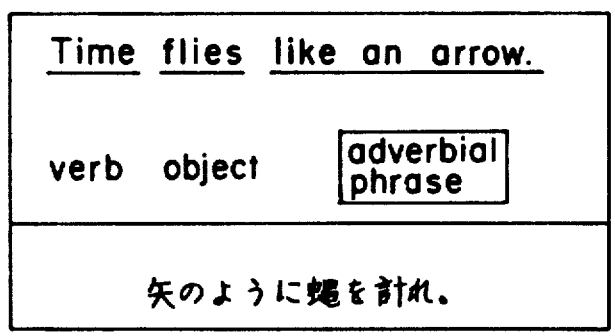
(3) 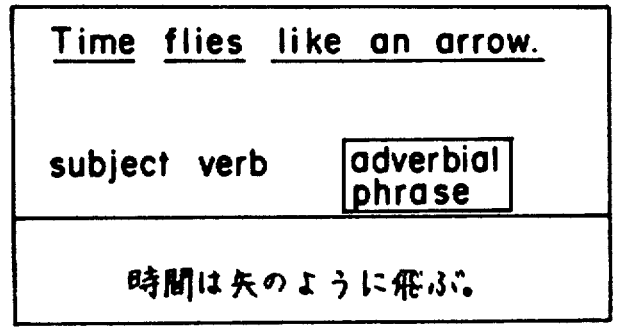

AI : acceptance instruction

CI : correction instruction

Fig. 18

(1)
| Time | |
|---|---|
| noun | |

(2)
| Time flies | |
|---|---|
| noun noun | |

(3)
| Time flies like | |
|---|---|
| noun  noun  preposition | |

(4)
| Time flies like an arrow. | |
|---|---|
| noun | |

(5)
| Time flies like an arrow. | 矢のような時間が飛ぶ。 |
|---|---|
| noun | |

(6)
| Time flies like an arrow. | 時間蝿は矢を好む。 |
|---|---|
| noun | |

(7)
| Time flies like an arrow. | 時間は矢のように飛ぶ。 |
|---|---|
| noun | |

Fig. 19
(1) 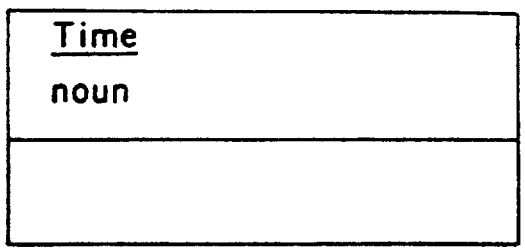
(2) 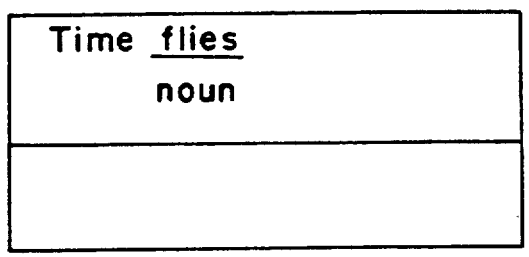
(3) 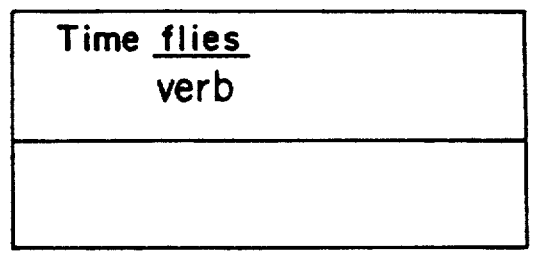
(4) 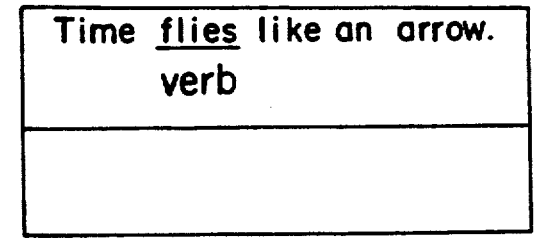
(5) 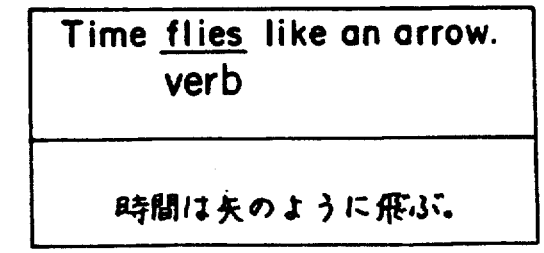

Fig. 20

(1) Time / noun (2) Time flies / noun (3) Time flies like / preposition (4) Time flies like an arrow. / preposition (5) Time flies like an arrow. / preposition — 矢のような時間蝿

(6) Time flies like an arrow. / preposition — 矢のように蝿を計れ.

(7) Time flies like an arrow. / preposition — 矢のような蝿を計れ.

(8) Time flies like an arrow. / preposition — 時間は矢のように飛ぶ.

SENTENCE TRANSLATION WITH MANUAL INPUTTING OF PART OF SPEECH INFORMATION BEFORE TRANSLATION

This application is a continuation of Ser. No. 07/614,972, filed Nov. 19, 1990, which is a which is a continuation application of Ser. No. 06/777,442, filed Sep. 18, 1985, both now abandoned.

FIELD OF THE INVENTION

The present invention relates to a translation system, and more particularly to a bilingual translation machine which performs translation from a first language into a different language under an interaction mode between the translation machine and an operator to complete a correct bilingual translation.

BACKGROUND OF THE INVENTION

In general, a bilingual translation using a translation machine is performed in a manner shown in FIG. 1, wherein the original sentence of a language to be translated must be analyzed in various ways in the process of translation in a translation machine. These analyses can be classified into morpheme analysis, sentence construction analysis or syntax analysis and meaning analysis. The morpheme analysis is to classify each of the words into the person, number and sequence of the sentence by referring to the grammatical information and translation information and a part of speech from a dictionary contained in the translation machine. The sentence construction analysis is analyzes the construction of the sentence by checking the grammatical relation of each of the words. The meaning analysis determines correct analysis and incorrect analysis on the basis of a plurality of sentence construction analyses. The machine translation is made by performing the morpheme analysis, sentence construction analysis and the meaning analysis up to a predetermined level to obtain an internal construction of the sentence of the original language and thereafter the machine converts the internal construction of the original language into an internal construction of the sentence of the translation language corresponding to the predetermined level, then the machine generates the output translation of the desired language. The accuracy of the translation in the machine depends on the degree of the predetermined level of the analysis. The translation made by using only the morpheme analysis can not realize a translation, on a sentence basis, the translation being limited to the word basis translation as performed in a portable type electronic translator. The translation machine performing morpheme analysis and sentence construction analysis can translate with grammatical correctness, but generates a plurality of translation results, so that the operator must select the correct translation among them, therefore the works of the operator increases. The translation machine performing up to the meaning analysis is theoretically able to output only one correct translation result, but there must be provided a great deal of information in the translation machine, therefore it may be impossible to manufacture such a translation machine.

The present invention is directed to a translation system of performing up to the sentence structure analysis. The translation system according to the present invention can perform translation on a sentence basis and can produce all grammatically correct translations.

FIG. 2 shows a typical translation system, wherein there are provided a processor 1, keyboard 2 having a plurality of keys for inputting necessary data to the processor 1, a memory 3 for storing the data relating to the processor 1, a display unit 4 for displaying the results obtained by the processing in the processor 1 and a translation module 5 for storing various information necessary for translation. The translation module 5 contains an original sentence buffer 51 for storing inputted original sentences, a dictionary buffer 52 for storing the result of consulting the dictionary, a sentence analysis buffer 53 for storing the result of analysis of the sentence structure of the original sentence, sentence forming buffer 54 for storing the content of the sentence analysis buffer 53 in the form of the output language, and a result buffer 55 for storing the result of the morpheme generation of the output language and a table including a dictionary, rule of grammar used in the translation machine, and so on. FIGS. 3 (1) to 3 (3) show the contents stored in the buffers 51 to 55 when the input sentence is Time flies like an arrow.

FIG. 3 (1) shows the contents of the original sentence buffer 51 and dictionary buffer 52. The dictionary buffer 52 takes the grammatical information and translation information such as a part of speech corresponding to the input word stored in the original sentence buffer 51. In the sentence analysis buffer 53 shown in FIG. 3 (2), the sentence structure is analyzed according to the information of the part of speech defined for each word. FIG. 3 (3) shows the content of the sentence forming buffer 54 and result buffer 55, wherein the result of the conversion of the content of the sentence analysis buffer 53 into the information for the output language is stored in the sentence forming buffer 54.

FIGS. 4 (1) to 4 (3) show an example of the display of a display device of the conventional translation machine.

As shown in FIG. 4 (1), when the sentence to be translated is inputted, the result of the translation is displayed as shown in FIGS. 4 (2) and 4 (3). The translated sentences as shown are the results of the translation performed under recognition of the parts of speech of each word as shown in the table 1 in which results of translation from English to Japanese and German are listed.

TABLE 1

| | input sentence (English) | translation (Japanese) | translation (German) |
|---|---|---|---|
| 1. | Time flies like an arrow. noun noun preposition noun | 矢 のような 時間 蝿 (Ya no yo na jikan hae) | Die Zeit-Fliege siebt aus wie ein Pheil. |
| 2. | Time flies like an arrow. verb noun preposition noun | 矢のように 蝿 を 計れ (Ya no yo ni hae o hakare) | Messen Sie die Fliege wie ein Pheil. |
| 3. | Time flies like an arrow. verb noun preposition noun | 矢 のような 蝿 を 計れ (Ya no yo na hae o hakare) | Messen Sie die Fliege, die sieht aus wie Pheil. |
| 4. | Time flies like an arrow. noun noun verb noun | 時間 蝿 は 矢を 好む (Jikan hae wa ya o konomu) | Die Zeit-Fliege hat den Pheil gern. |
| 5. | Time flies like an arrow. | 時間 は 矢 のように とぶ | Die Zeit fliegt so schnell wie ein Pheil. |

TABLE 1-continued

| input sentence (English) | translation (Japanese) | translation (German) |
|---|---|---|
| noun verb preposition noun | (Jikan wa ya no yo ni to bu) | |

The translations are correct so far as rules grammar are concerned. Apparently, a user can determine that the translation shown in item 5 is correct. However, the translation machine can not determine which translation is correct. If the meaning analysis is perfect, the translation machine can output the translation of item 5. However in order to make the correct translation, it is necessary to store the following information with respect to the meaning analysis, (a) an arrow does not resemble a fly, (b) an arrow is not provided with an ability of measuring time, (c) it can not considered that a fly likes an arrow.

Apparently it is almost impossible to store all the information of the real world in the translation machine. Accordingly, in the conventional translation machine, several translated sentences having different meanings are produced from one input sentence although only one translation should occur from one input sentence. Since several translations occur in the conventional translation machine, the operator of the translation machine must repeat several operations for obtaining a correct translation. Furthermore, in the machine translation, all possible solutions of the translation are searched and the translation machine acts to obtain all possible solutions, whereby it takes much time to obtain the correct translation. Therefore, the conventional translation machine acts to output each of the solutions every time a solution is found. Accordingly, in the case shown in FIGS. 4 (1) to 4 (3), for example, when the first solution shown in FIG. 4 (1) is displayed, the operator can not know how many solutions remains. Therefore, the conventional translation machine has another disadvantage that the operator can not estimate how many times he must operate the translation key for obtaining the correct solution in addition to the disadvantage that frequent operation of the translation key for obtaining the correct solution is necessary. These disadvantages represent a mental burden on the operator. Thus, it is desired to decrease the number of operations of the translation key for obtaining the correct solution.

SUMMARY OF THE INVENTION

An essential object of the present invention is to provide a bilingual translation system which is able to obtain a correct solution of the translation with a decreased number of operation of a key and with simple operation.

According to the present invention, there is provided a translation system performing translation from a first language into a second language under an interaction mode between said translation system and an operator, comprising means for inputting an original sentence to be translated, means for translating the input sentence of said first language into an output sentence of said second language, wherein the operator inputs information relating to at least one word of the input sentence, the translation being performed on the basis of said input information.

DETAILED DESCRIPTION OF PREFERRED EMBODIMENTS

Figure 1:
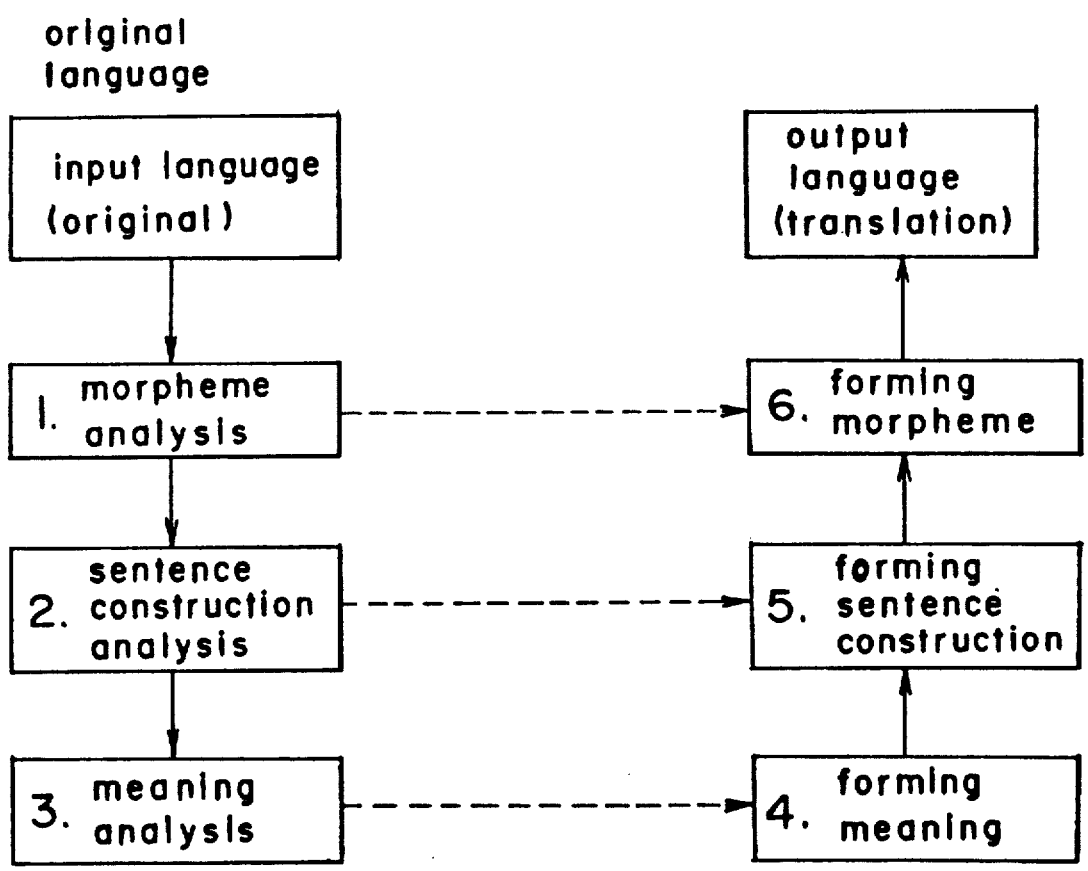
FIG. 1 is a block diagram showing a process of a bilingual translation.
Figure 2:
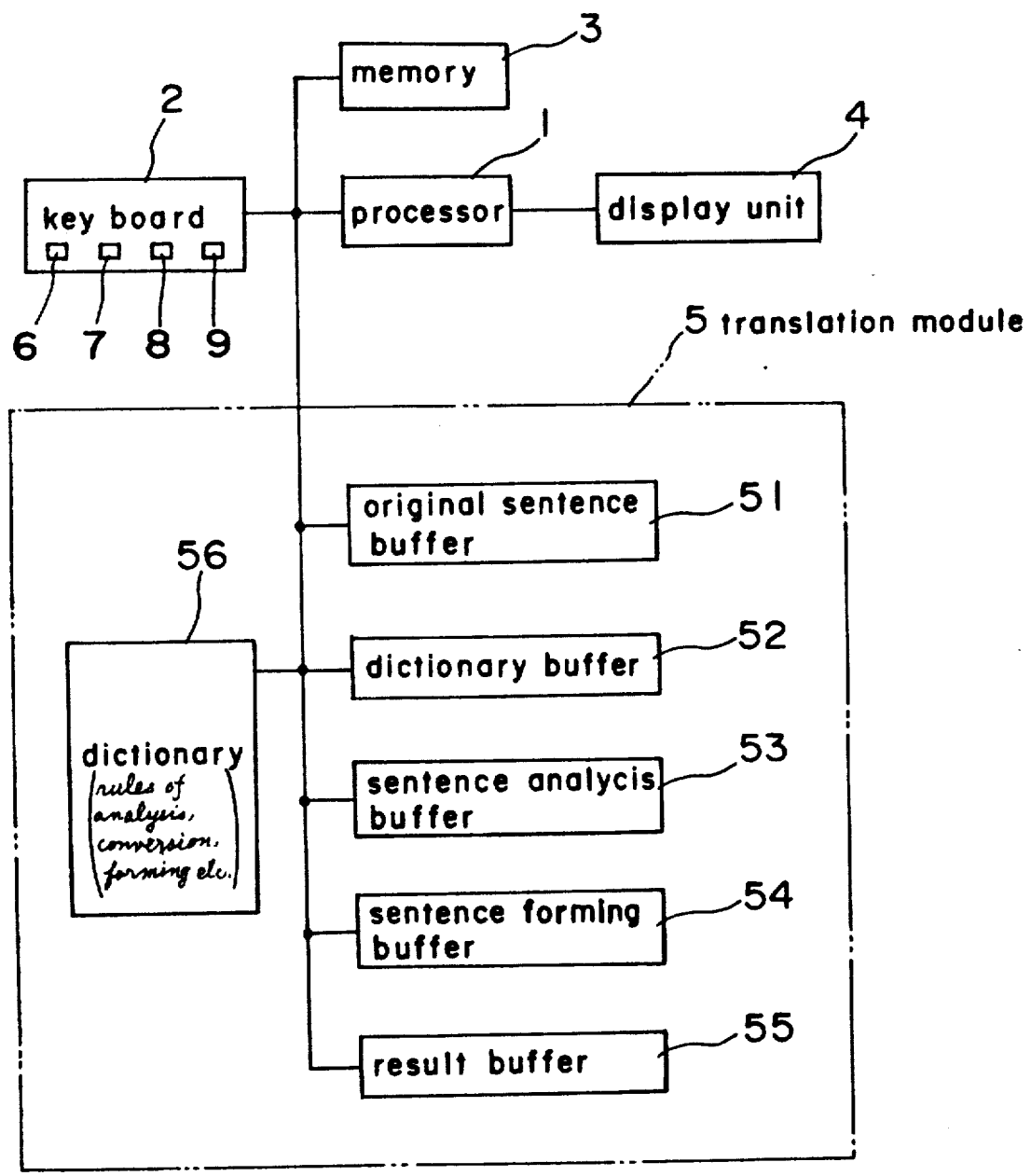
FIG. 2 is a block diagram of a translation machine used in the present invention, FIGS. 3 (1) to 3 (3) are schematic diagrams showing the conventional way of storing various informations in the buffers used in the translation machine, FIGS. 4 (1) to 4 (3) are schematic diagrams showing various outputs of the result of translation in the conventional translation system, FIGS. 5 (a) and (b) is a flow chart showing the operation of a translation system according to the present invention, FIGS. 6 (1) to 6 (4), 7 (1) and 7 (2) and 8 (1) to (5) are respectively schematic diagrams showing examples of the display according to the present invention, FIGS. 8 (1) to 8 (3) are schematic diagrams showing modes of storing various information in the buffers according to the present invention, FIGS. 9 (1) to 9 (3) show the contents of the buffers used in the translation system according to the present invention, FIG. 10 (a) and (b) is a flow chart showing another embodiment of the present invention, FIGS. 11 (1) and (2) and 12 (1) and (2) are schematic diagrams showing examples of the display employed in the embodiment shown in FIG. 10, FIG. 13 (a) and (b) is a flow chart showing a further embodiment of the present invention, FIGS. 14 (1) and (2), 15 (1) and (2) and 16 (1) to (3) are schematic diagrams showing examples of the display used in the embodiment shown in FIG. 13.

FIG. 2 shows a typical translation system, wherein there are provided a processor 1a, keyboard 2 having a plurality of keys for inputting necessary data to the processor 1, a memory 3 for storing data relating to the processor 1, a display unit 4 for displaying the results obtained by the processing in the processor 1 and a translation module 5 for storing various information necessary for translation. The translation module 5 contains an original sentence buffer 51 for storing inputted original sentence, a dictionary buffer 52 for storing the result of consulting the dictionary, a sentence analysis buffer 53 for storing the result of analysis of the sentence structure of the original sentence, sentence forming buffer 54 for storing the content of the sentence analysis buffer 53 in the form of the output language, and a result buffer 55 for storing the result of the morpheme generation of the output language and a table including a dictionary, rules of grammar used in the translation machine, and so on. According to the present invention there are provided a plurality of keys in the keyboard 2 including keys for inputting various information related to the sentence such as keys for inputting parts of speech, for example noun, verb, adverb or the like, name of the elements of the sentence such as subject, object, adverbial phrase, and so on.

The operation of the translation system according to the present invention is explained with reference to FIG. 5. In the step n1, a sub candidacy flag (SC flag) is reset prior to the input of the original sentence to be translated. The sub candidacy flag represents an error when no translation solution is obtained even if possible sentence construction analyses are made using possible combinations of the part of speech of each word of the original sentence. When a word of the original sentence is input by the keyboard 2, it is judged in the step n 2 whether the signal thus entered is the word input or the instruction from the translation key for starting the translation. With the word input, the word thus entered is displayed on the display device 4 through the processor 1, which transfers the character code of the word to the translation module 5. The character code of the word is stored in the original sentence buffer 51, and the translation module 5 performs the morpheme analysis consulting the dictionary in the step n4. According to the present invention, an instruction for designating the part of speech of the input word (referred to as PSD instruction hereinafter) can be entered by the operator at the time of inputting the word. Presence or absence of the PSD instruction is judged in the step n5. With absence of the PSD instruction, the step moves to n8. With presence of the PSD, the step moves to n6 wherein the name of the part of speech of the word is displayed on the display device 4 and the word or words which are taken from the dictionary but are not designated by the PSD instruction are excluded in the step n7. In the flow charts, UPS is abbreviation of undesignated part of speech and PS is part of speech. In case the PSD instruction is absent in the step n5, all the results taken out of the dictionary corresponding to the input word are stored in the dictionary buffer 52 in the step n8. In case the PSD instruction is present in the step n5, the dictionary buffer 52 stores only the results corresponding to the part of speech designated by the input PSD instruction. In case of absence of the PSD instruction while the words of the original sentence are consecutively entered, the steps n2, n3, n4 n5 and n8 are repeated, and in case of presence of the PSD instruction while the words of the original sentence are consecutively entered, the steps n2, n3, n4, n5, n6, n7 and n8 are performed and the process returns to step n2 and the operation is repeated. When the input of the original sentence is completed, and it is judged that the translation instruction is present, the step advances to n9, wherein the combination of the part of speech is initially set and the step advances to n10. In the step n10, the sentence construction analysis is performed referring to the analysis rules of the table 56 and the sentence analysis buffer 53 is completed. In the step n11, it is judged whether or not the sentence construction analysis (referred to as S.A. in the flow chart) is successful. When the sentence analysis is successful, the step goes to n12, wherein the conversion of the sentence construction is made referring to the conversion rule and generation rule stored in the table 56 of the translation module 5. Subsequently, the formation of the sentence construction is made on the step n13 to complete the sentence forming buffer 54. Then the result buffer 55 is completed and the content of the result buffer 55 is displayed by the display unit 4 in the step n15. Subsequently it is judged in the step n16 whether or not the key input of the sub candidacy has been activated for forming the sub candidacy. With the presence of the sub candidacy input, a sub candidacy flag is set in the step n17. Thus the sub candidacy flag is set when the operator requests another translation after a translation is once completed. Then the step is returned to n10 from n17 for the sentence construction analysis, the sentence analysis buffer 53 storing the previous combination of the part of speech and the result of the previous sentence construction analysis, so that the translation machine can search a further result of the sentence construction analysis which is different from the result of the previous sentence construction analysis. If there is no different analysis of the original sentence for the different combination of the part of speech, it is judged that there is a failure, and the step advances from n11 to n18. In the step n18 it is judged whether or not the sentence construction analyses are completed for all of the combinations of the part of speech. In case the sentence construction analysis for all combinations of the part of speech is not completed, the step is moved to n19, wherein a new combination of the part of speech is formed and in turn the sentence construction analysis in the step n10 is performed.

When the sentence construction analysis is successful, the steps n11 to n15 are performed. On the contrary, if the sentence construction analysis thus performed is still unsuccessful, the step goes to n17 from n16 and to n10 again by the instruction of the sub candidacy entered by the operator. In this case if there is another solution for the same combination of the part of speech, the process of the steps n11 to n15 are performed. If the result of the analysis is again unsuccessful, the step moves to n17 from n16 by the instruction of the operator, and in the step n10 the sentence construction analysis is performed. In general, when there occur two different results of the analysis for the same combination of the part of speech, the steps n17, n10, n11, n12, n13 n14 and n15 and the result of the operation can be performed with the results displayed, waiting the instruction of the operator. In case there is only one result of the analysis for the combination of the part of speech, the steps n17, n10, n11 and n18 are performed. Then it is judged whether or not the sentence construction analysis for all combinations of the part of speech are completed, and if it has not been completed, the new combination of the part of speech is formed in the step n19 and the step returns to n10. If the sentence construction analysis is successful for the new combination of the part of speech, the steps n11, n12, n13, n14 and n15 are performed, the result of the sentence construction analysis is displayed and the machine waits for the subsequent instructions of the operator. If the sentence construction analysis is unsuccessful, the step moves to n18 from n11 and it is judged whether or not the sentence construction analyses for all combinations of the part of speech are completed. In case the sentence construction analysis is successful and a correct translation is obtained, the step is moved to n22 from n16. Then it is judged in the step n22 whether or not a further sentence is input. If a subsequent sentence is input, the step goes to the step n1, to the contrary, if no sentence is input, the translation is finished.

In case it is determined in the step n18 that the sentence construction analyses are completed for all combination of the part of speech, the step moves to n20, wherein it is judged whether or not the sub candidacy flag is set. If the sub candidacy flag is set, the step moves to n9, and if the sub candidacy flag is not set, the step is moved to n21. In case the sentence construction analyses fail for all combinations of the part of speech, the sub candidacy flag is remained reset since the steps are circulated in the loop of n10, n11, n18, n19 and n10. In this case the error is displayed in the step n21.

FIGS. 6 to 8 show various examples of the display of the result of the translation. FIG. 6 is an example when the word "Time" is designated by noun. FIG. 7 is another example when the word "flies" is designated by verb. FIG. 8 is a further example when the word "like" is designated by preposition. In these cases, the designation of the part of speech is made at the time of input of one word. As shown in FIG. 7, in case the word "flies" is designated by verb, only one solution of the translation can be obtained, so that the correct translation can be obtained at the first candidacy. In the present invention, one word may be designated by a part of speech or a plurality of words may be designated by a plurality of the parts of speech respectively. For example, the word "Time" is designated by noun and the word "like" may speech is subject, verb, adverb phrase. In the third level it can be analyzed that with subject and predicate, a sentence can be constructed. FIG. 9 (3) shows the content of the sentence forming buffer 54. The content of the sentence forming buffer 54 becomes subject and predicate in the first level. In the second level, the content of the sentence forming buffer 54 becomes noun phrase, adverb phrase and verb. Thus, the content of the translated sentence is stored in the result buffer 55 on the basis of the sentence formation. As described above, according to the present invention, when the sentence to be translated is entered in the translation machine, the part of speech can be designated for the necessary words, and the translated sentence can be produced according to the designated part of speech.

Figure 10A:
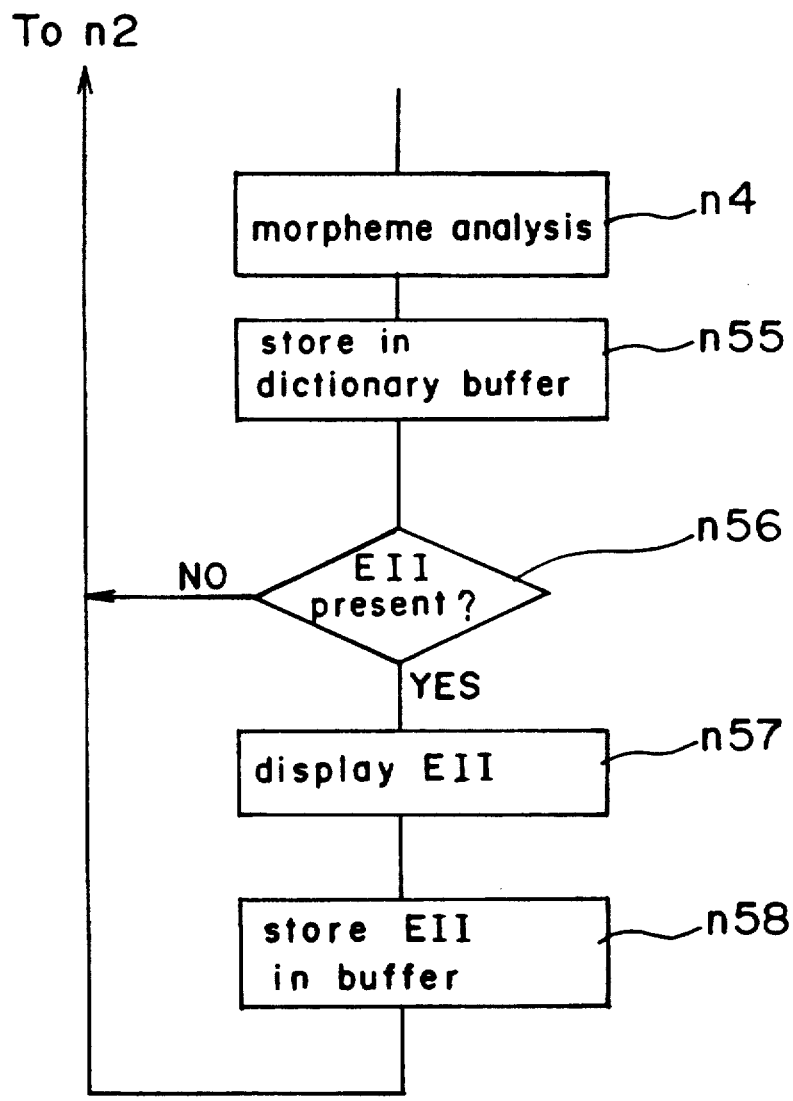
Figure 10B:
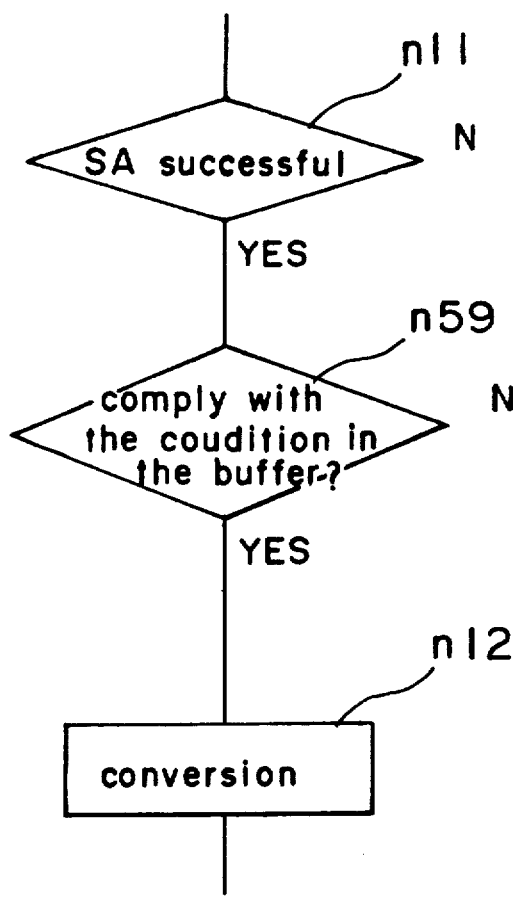

FIG. 10 shows another embodiment of the translation system according to the present invention, wherein the interrelation between constructive elements of any words of the input sentence (referred to as construction interrelation hereinafter) can be entered into the translation system and the translation performed on the basis of the construction interrelation. It is noted that the description of like operations shown in FIG. 5 is omitted.

Table 2 shows various examples of the construction interrelation.

TABLE 2

| | Input original sentence | Translation (Japanese) | Translation (German) |
|---|---|---|---|
| (i) | Time flies like an arrow<br>adjective modification | 矢のような時間蝿 | Die Zeit-Fliege sieht aus wie ein Pheil. |
| (ii) | Time flies like an arrow<br>verb/object<br>adverbial modification | 矢のように蝿を計れ | Messen Sie die Fliege wie ein Pheil. |
| (iii) | Time flies like an arrow<br>verb/object<br>adjective modification | 矢のような蝿を計れ | Messen Sie die Fliege, die sieht aus wie Pheil. |
| (vi) | Time flies like an arrow<br>subject/verb  verb/object | 時間蝿は矢を好む | Die Zeit-Fliege hat den Pheil gern. |
| (v) | Time flies like an arrow<br>subject/verb  adverbial modification | 時間は矢のようにとぶ | Die Zeit fliegt so schnell wie ein Pheil. | be designated by preposition simultaneously.

FIG. 9 shows the contents of the buffers 51 to 56. The original sentence to be translated is stored in the original sentence buffer 51 and when the word "like" is designated by preposition as shown in FIG. 9 (1), in the dictionary buffer 52, noun is absent for the word "flies" but verb is present. Under such state, if the word "time" is designated by noun, "flies" by verb, "like" by preposition, "an" by article and "arrow" by noun initially, the translation module 5 conducts the sentence construction analysis as shown in FIG. 9 (2) referring to the rule of analysis stored in the table 56. In this case according to the first construction level, the combination of the part of speech is noun, verb, preposition, article and noun. In the second level, the combination of the part of In the step n55 the result of the morpheme analysis is stored in the dictionary buffer 52 and the step is moved to n56 to judge whether or not there is the instruction of the construction interrelation. In the absence of the instruction of the construction interrelation the step returns to n2, while with presence of the instruction, the step goes to n57, wherein the construction interrelation is displayed on the display unit 4. FIG. 11 shows an example of the display to show that the words "Time" and "flies" are related as subject and verb. In the step n58, the content of the construction interrelation thus instructed is stored in the sentence analysis buffer 53. These operations of the steps n2 to n8 are continued while the input operation of the original sentence is continued.

When the input of the original sentence to be translated has been completed and the translation instruction is entered by the translation key, the processes n9 to n11 are performed. If the sentence construction analysis is successful, the step goes to n59 wherein it is judged whether the result of the sentence construction analysis thus obtained in the step n10 complies with the condition stored in the sentence analysis buffer 53. If the result of the sentence construction analysis does not comply with the condition stored in the sentence analysis buffer 53 in the step n58, the process returns to the step n10 to repeat the sentence construction analysis again. If the result of the sentence construction analysis complies with the condition stored in the sentence analysis buffer 53, the step goes to n12 to convert the original sentence into the translated sentence construction so as to obtain the translation. FIG. 11 (2) shows an example of the display of the translation thus obtained by the operations mentioned above. FIG. 12 (1) shows an example of the display by the operation of the step n56 of the construction interrelation instructed by the operator. FIG. 12 (2) shows the result of the translation by the instruction of the construction interrelation showing that the phrase "like an arrow" has a relation of the adverbial modification to the word "flies". The instruction of the construction interrelation may be made in such a manner that two desired parts a and b in the sentence are first designated by region designation operation by the operator, then a direction c of the modification between two phrases is instructed by the key operation and by operation of the instruction of the construction interrelation, the construction interrelation d between two elements of the sentence can be displayed. Although only one construction interrelation is designated in this embodiment, two or more construction interrelation between two elements of the sentence can be designated.

Figure 13A:
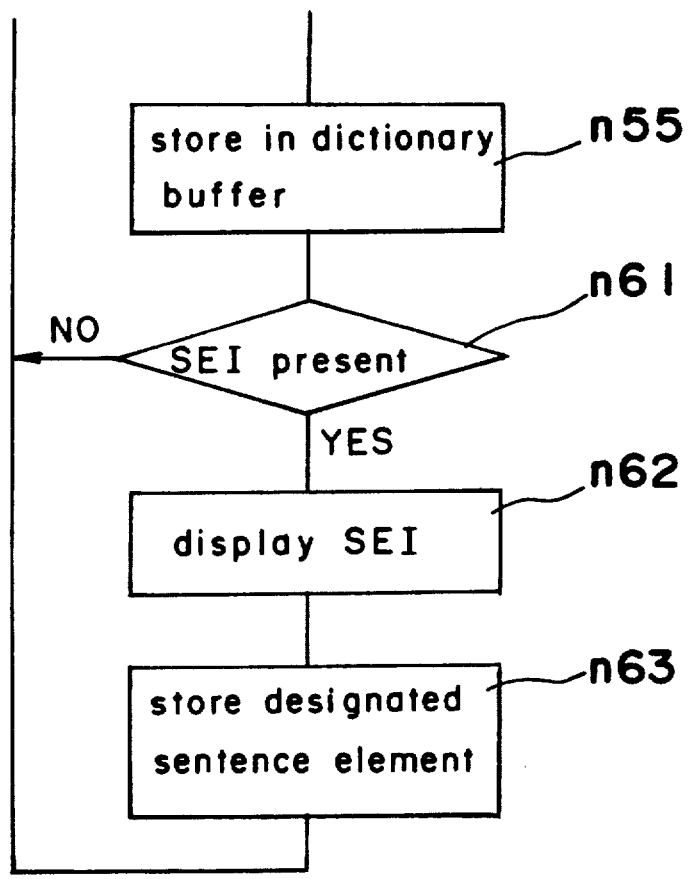
Figure 13B:
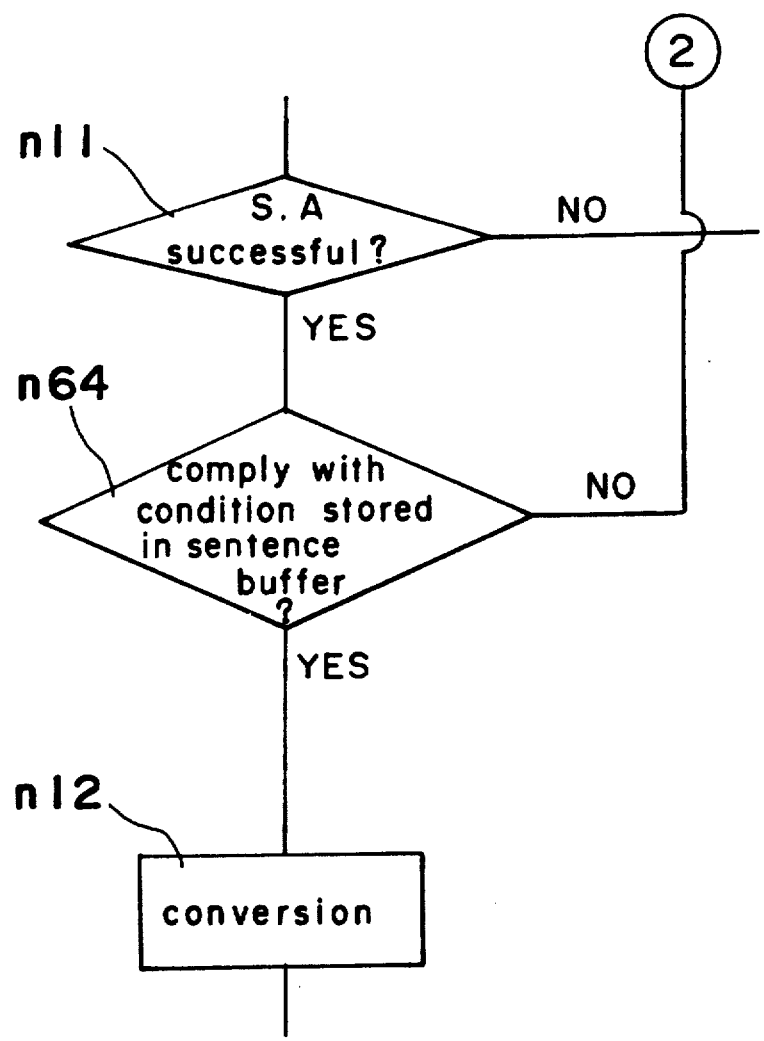

FIG. 13 (a) and (b) shows a further embodiment of the translation system according to the present invention, wherein the name of the designated element of the sentence can be entered and the translation is performed on the basis of the input name of the element. It is noted that the description of like operations shown in FIG. 5 is omitted.

Table 3 shows examples of the name of the element.

the sentence element stored in the sentence analysis buffer 53 is used as the condition for the translation. So far as the input of the original sentence is continued, the steps n2 to n5 and n61 to n63 can be repeated. After input of the original sentence has been completed, the step goes to n64 through the steps n9 to n11 performing the same operation as mentioned with reference to the embodiment shown in FIG. 5. In the step n64, it is judged whether the result of the sentence construction analysis performed in the step n10 complies with the condition stored in the sentence analysis buffer 53. The step then goes to either n12 or n17 depending of the result of the judgement in the step n64. These operations after the step n12 and n17 are the same as those performed in the embodiment shown in FIG. 5. FIG. 14 (1) shows an example of the display of the original sentence and the state that the word "Time" is designated as the subject.

FIG. 15 (1) shows an example of the display of the name of the element of the original sentence instructed by the operator in which the word "flies" is designated by the verb. FIG. 15 (2) shows that the phrase "like an arrow" is designated by the adverbial phrase. The instruction of the name of the element of the sentence may be made in such a manner that the operation of a key for designating the element of the sentence causes a cursor to move by every word and the name of the element designated by the cursor is displayed. In FIG. 15 (2) only the name of verb of the element for the word "flies" is designated. In this example, the correct translation can be solely obtained by designating the name of the part of speech of only the one word "flies". In case the phrase "like an arrow" is designated by the name of adverbial phrase, the correct translation can be obtained through two candidacies as shown in FIGS. 16 (2) and (3). Two or more names of the elements of the sentence may be designated. For example, it is possible to designate the name of the elements of "Time" as subject and "like an arrow" as adverbial phrase.

Figure 5A:
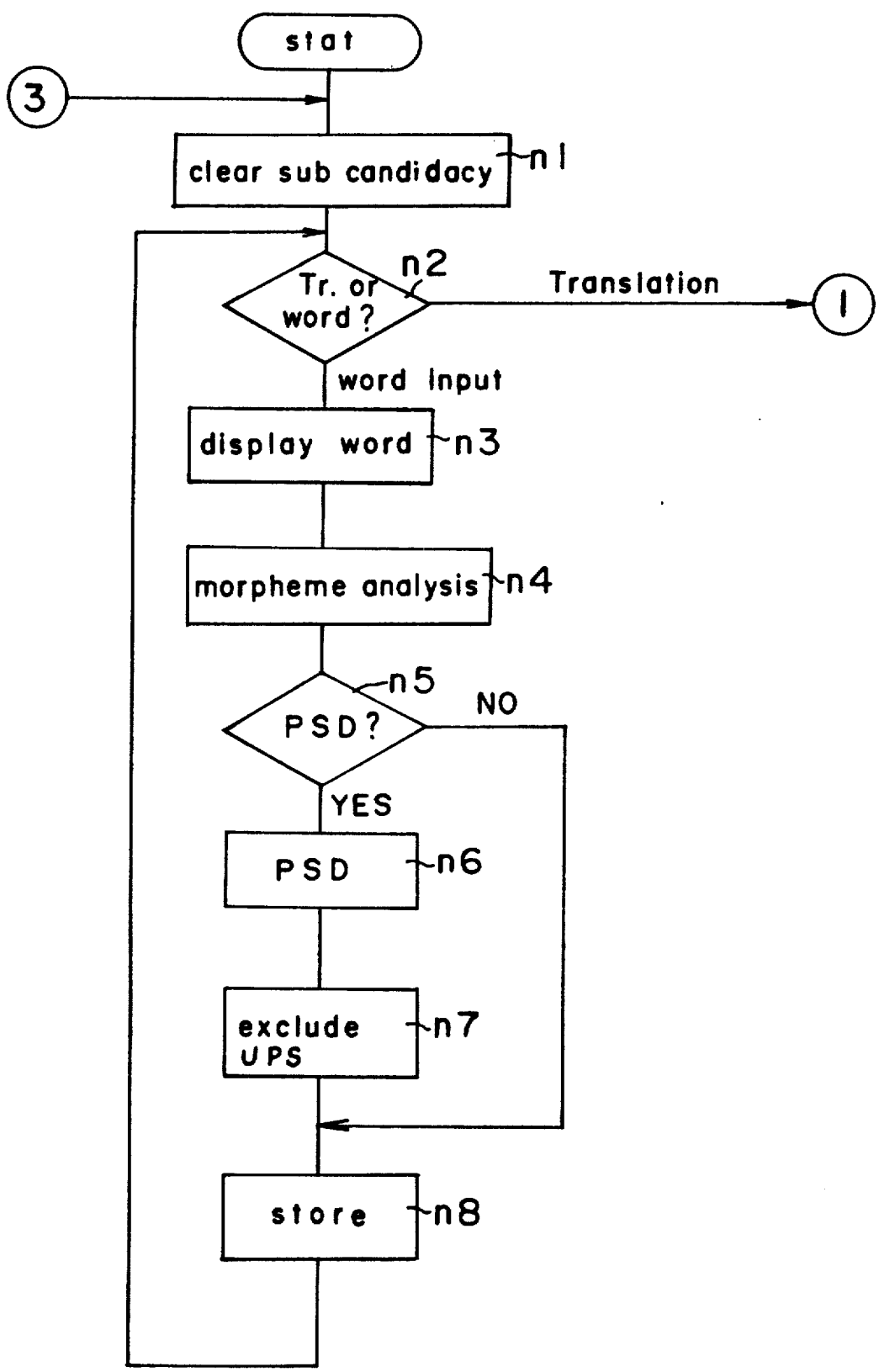
Figure 5B:
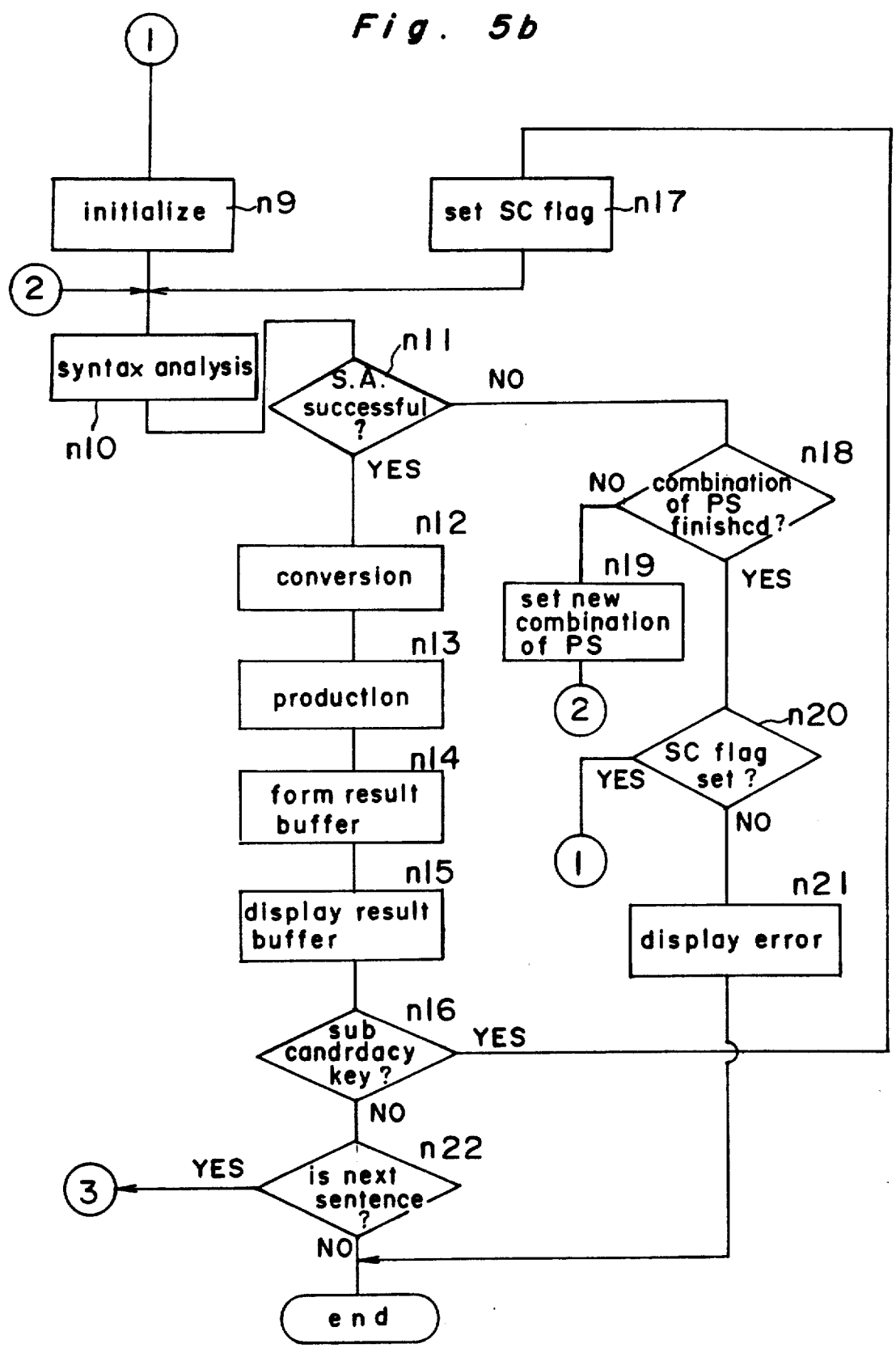
Figure 17:
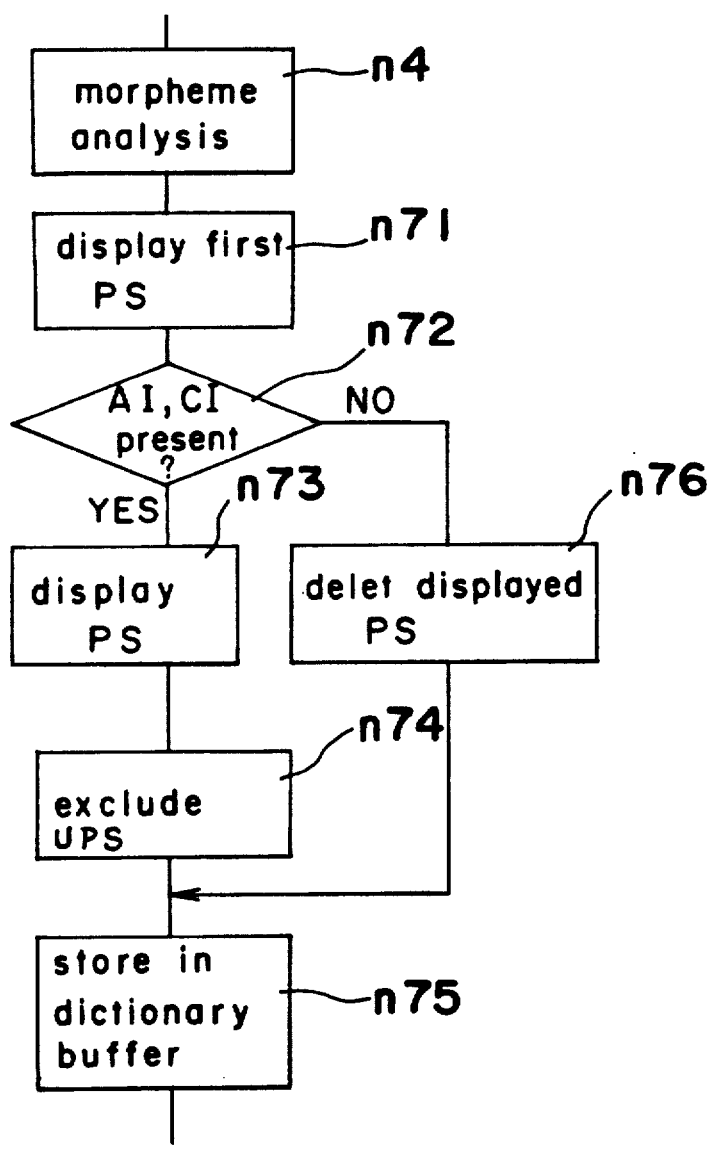
FIG. 17 is a flow chart showing a still further embodiment of the present invention, FIGS. 18 (1) to (7), 19 (1) to (5) and 20 (1) to (8) are schematic diagram showing examples of the display used in the embodiment shown in FIG. 17, and FIGS. 21 (a) and (b) and 22 (a) and (b) are flow charts showing still further embodiments of the present invention.

Referring to FIG. 17 showing a still further embodiment of the translation system according to the present invention, wherein after the morpheme analysis in the step n4 of the embodiment shown in FIG. 5 is performed, the primary part of speech of the input word which is the result of consulting the dictionary is displayed in the display unit 4 in the step n71. Subsequently, it is judged in the step n72 whether or not the displayed primary part of speech of the input word is

TABLE 3

| | Input original sentence | Translation (Japanese) | Translation (German) |
|---|---|---|---|
| (i) | Time flies like an arrow. noun phrase adjective phrase | 矢のような時間蝿 | Die Zeit-Fliege siebt aus wie ein Pheil. |
| (ii) | Time flies like an arrow. verb object adverbial phrase | 矢のように蝿を計れ | Messen Sie die Fliege wie ein Pheil. |
| (iii) | Time flies like an arrow. verb object adjective phrase | 矢のような蝿を計れ | Messen Sie die Fliege, die sieht aus wie Pheil. |
| (vi) | Time flies like an arrow. subject verb object | 時間蝿は矢を好む | Die Zeit-Fliege hat den Pheil gern. |
| (v) | Time flies like an arrow. subject verb adverbial phrase | 時間は矢のように とぶ | Die Zeit fliegt so schnell wie ein Pheil. |

Referring to FIG. 13, in the step n61 it is judged whether or not the name of the input element of the sentence is input. If the name of the element is not inputted, the step returns to the step n2. If the name of the element is inputted, the step is moved to n62 to display the name thus inputted by the display unit 4. In the step n63, the name of the element thus designated is stored in the sentence analysis buffer 53. The designated name of accepted by the operator. Acceptance or correction of the displayed part of speech can made by operating the keys 8 or 9. If the instruction of the acceptance or correction by the keys 8 or 9 is absent, the step goes to n76 to eliminate the display of the part of speech of the input word. If the instruction of the acceptance or correction is present, the step goes to n73 to display the accepted or corrected part of speech. Then the parts of speech except for the accepted or corrected part of speech are eliminated from the result of the consultation of the dictionary, then the dictionary buffer 52 stores only the part of speech thus accepted or corrected. In the examples shown in FIG. 18, the operator accepts the noun which is displayed as the part of speech for the word "time". Then the verbal, part of speech of the word "Time" is eliminated. Since the verb is excluded from the part of speech stored in the dictionary buffer 52, the results of the translation are those shown in FIGS. 18 (5) to (7). Thus, the solutions shown in the items (iii) and (vi) of the table 3 are excluded, so that the number of operations of the keys 6, 7, 8 and 9 can be decreased by two times.

FIGS. 19 and 20 show further examples of the display on the display unit 4 according to this embodiment. In FIGS. 19 (1) and 20 (1), the input words and the part of speech in the step n71 are displayed. FIGS. 19 (2) and (3) show that the result of correction by the operator from the noun of the displayed part of speech for the word "flies" to the verb. FIGS. 20 (2) and (3) show the result of the acceptance by the operator for the displayed part of speech of the preposition for the word "like". FIGS. 19 (4) and 20 (4) show the original sentence and the respective parts of speech for the words of the original sentence. In case the part of speech of the word "flies" is corrected to the verb, the result of the translation is as shown in FIG. 19 (5), so that only one correct translation can be obtained. In case the word "like" is designated as the preposition, the results of the translation are as shown in FIGS. 20 (5) to (8), so that the wrong translation of the item (4) in the table 3 can be excluded, so that the number of key operations can be decreased by one. In this embodiment, the operation of the instructions of acceptance and correction against the displayed part of speech may be made for two or more words. For example, in the embodiment shown in FIG. 18, after input of the acceptance instruction of the noun for the word "Time" another acceptance instruction is input of the preposition for the word "like".

Although the name of the part of speech of the word stored in the dictionary buffer 52 is displayed and the operator sentence the desired part of speech, the name of the part of speech of the word may be made by the operation of a key, so that the translation is made on the basis of the part of speech thus inputted. In this modification, the inputted part of speech may not be stored in the dictionary buffer 52.

Figure 21A:
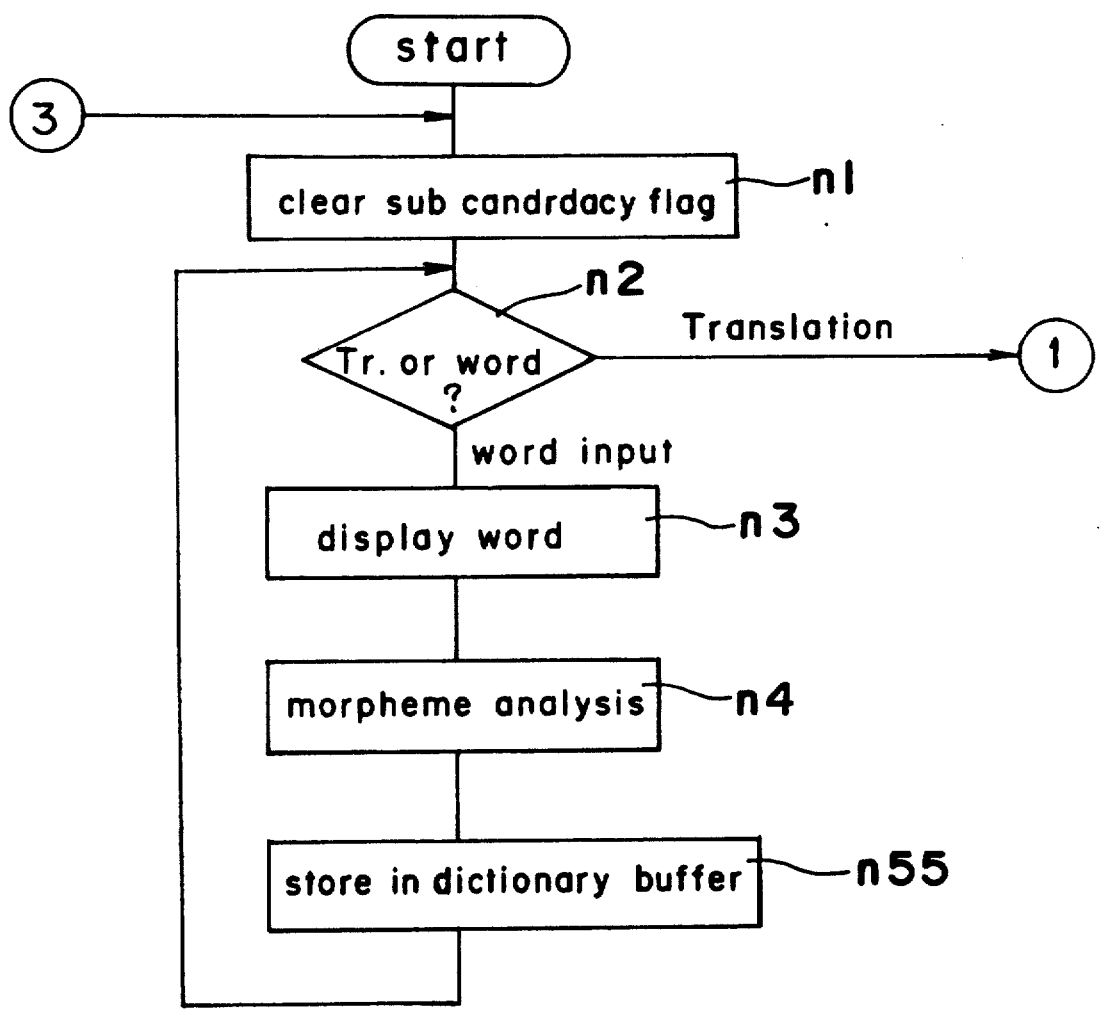
Figure 21B:
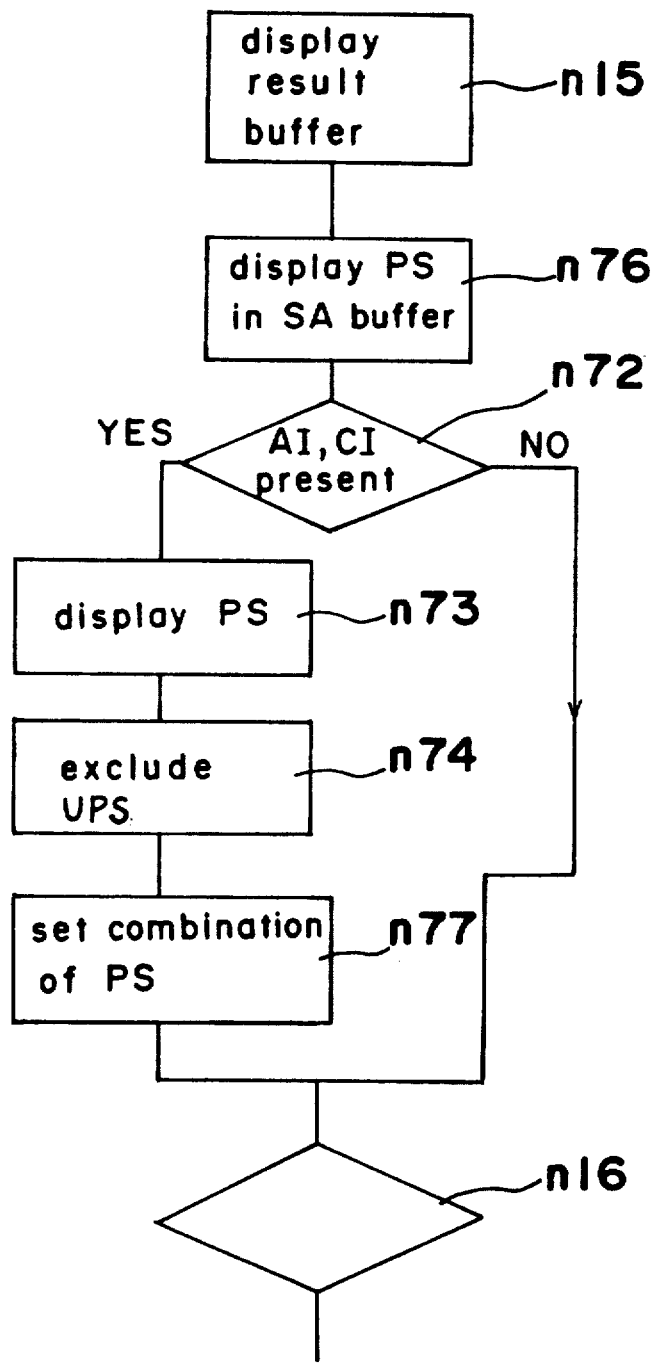

Referring to FIGS. 21(a) and (b) a still further embodiment of the translation system according to the present invention, wherein the processes of the steps n72 to n74 shown in FIG. 17 are put after the process of the display of the content of the result buffer 55 performed in the step n16 with the steps n76 and n77 added. In the step n76, each part of speech of each word in the sentence analysis buffer 53 is displayed. In the step n77, the combination of the parts of speech of the words are arranged again.

Figure 22A:
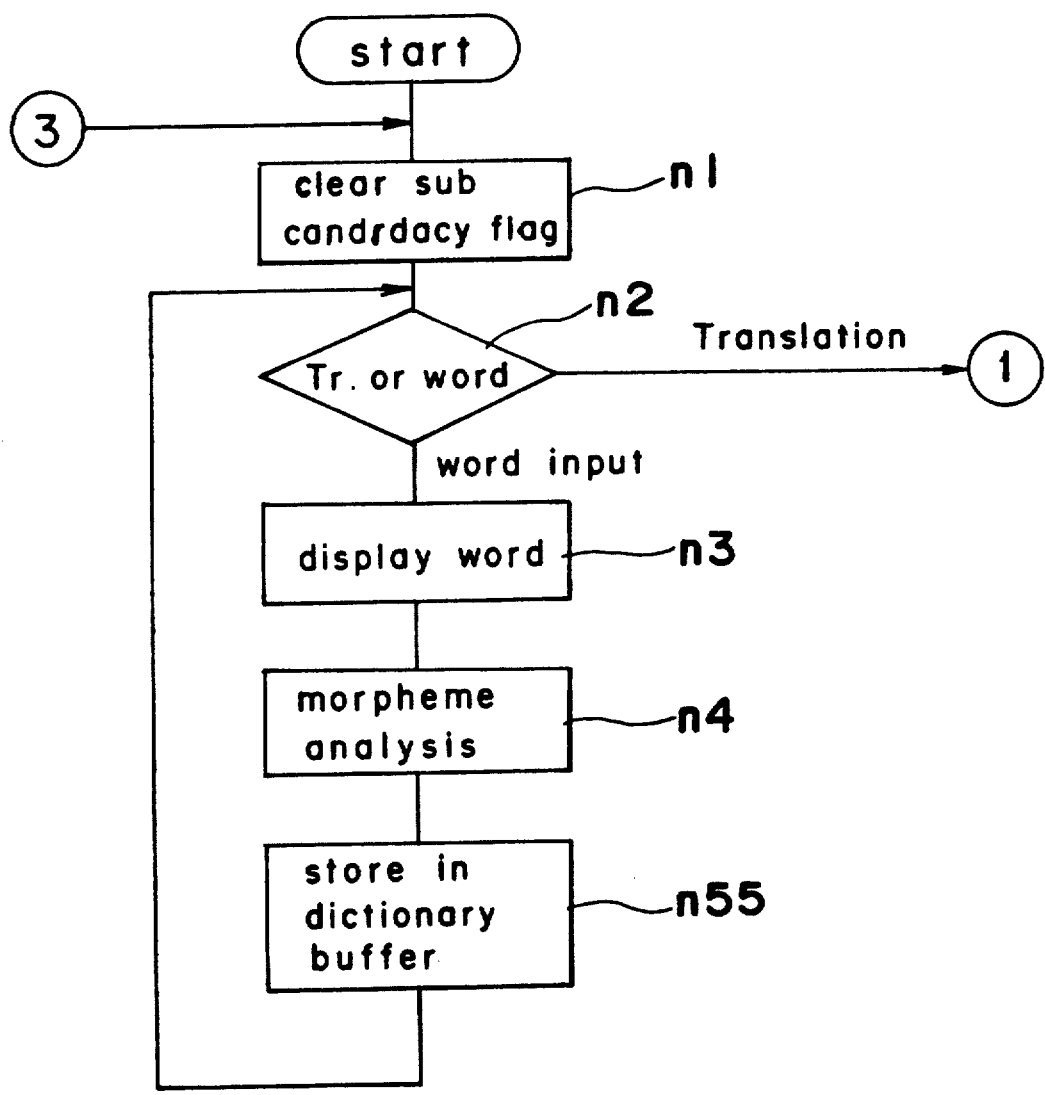
Figure 22B:
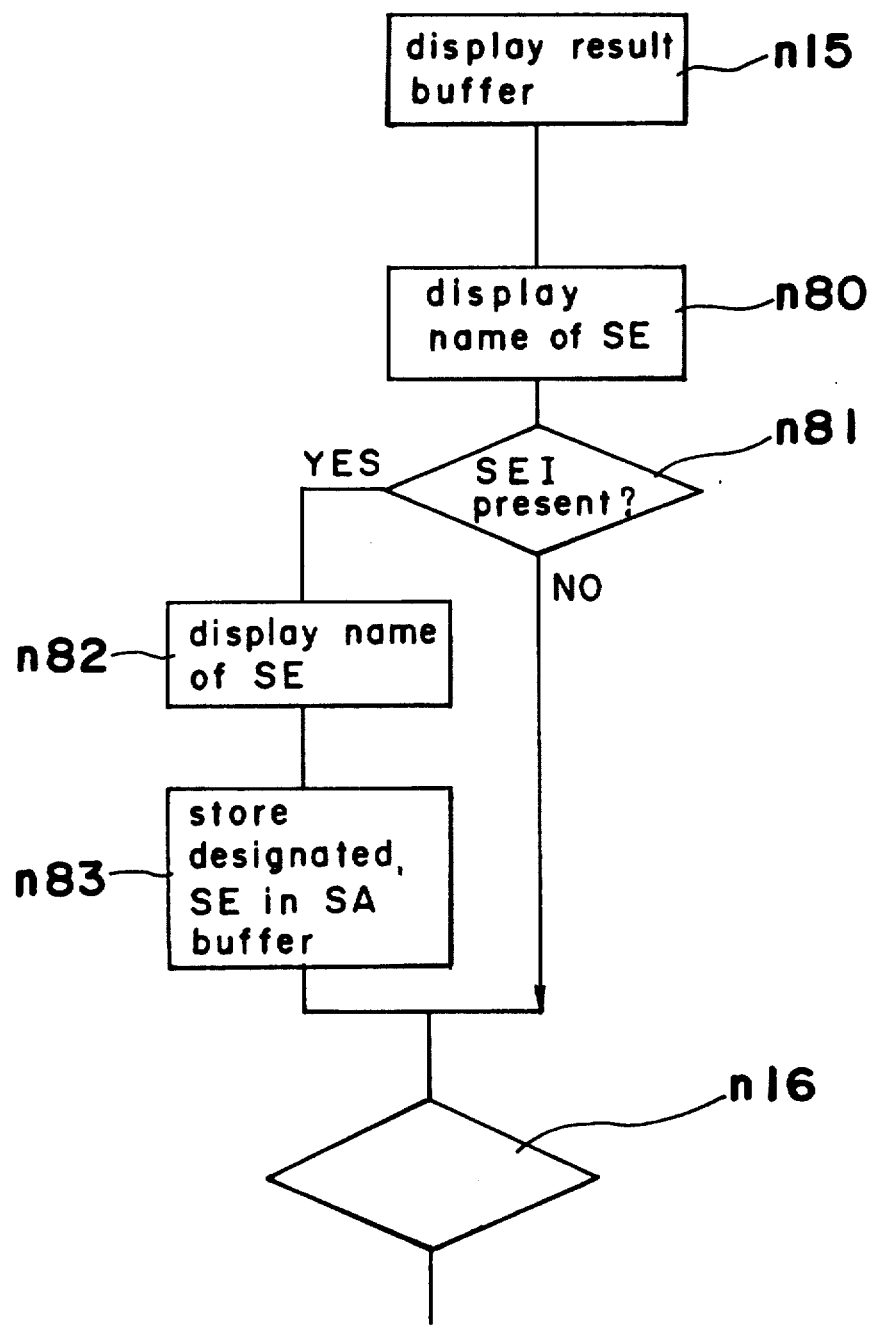

Referring to FIGS. 22(a) and (b), showing a still further embodiment of the translation system according to the present invention, wherein processes of the steps n80 to n83 are put after the step n15 shown in FIG. 10. In the step n80, the names of the elements of the sentence to be translated is displayed. In the step n81, it is judged whether or not an instruction of the sentence element is present. With yes in the step n81 the step goes to n82 wherein the name of the element of the sentence thus instructed is displayed. In the step n83, the name of the element of the sentence thus instructed is stored in the sentence analysis buffer 53, then the step goes to the step n18.

Although various embodiments are described, modification of the translation system of the invention may be made by combining the various input operations mentioned above. For example, in the embodiment shown in FIG. 12 in place of designating the name of the element of the sentence, the name of parts of speech and so on may be used.

Also, the translation system according to the present invention can be applied to bilingual translation between any two languages such as English to German, German to French or the like.

What is claimed is:

1. A translation system for translating sentences from a first language into a different second language, comprising:
   means for inputting and displaying a sentence to be translated;
   means for manually inputting, by an operator, information related to at least one word of said sentence, said information defining the part of speech of said word selected by the operator based on the context of said sentence;
   means for translating said sentence into said second language, said means for translating utilizing said information in performing said translations; and
   means for outputting a sentence in said second language corresponding in meaning to said sentence to be translated, in response to a completed translation by said means for translating.

2. The apparatus of claim 1 wherein said means for manually inputting information includes a button.

3. The translation system according to claim 1, wherein said information is a designation of the part of speech, designated by an operator from a plurality of parts of speech available to the operator before translation.

4. The translation system according to claim 1, wherein said means for manually inputting inputs a plurality of parts of speech, for a plurality of words of the sentence, with a single part of speech associated with a single word so that the correct part of speech being is associated with a word in the context of the sentence before translation.

5. The translation system according to claim 4, wherein said plurality of parts of speech are different from each other.

6. The translation system according to claim 1, wherein the information defining parts of speech defines a part of speech for each word of the sentence.

7. A translation system for translating sentences from a first language into a different second language, comprising:
   means for inputting and displaying a sentence to be translated;
   means for manually inputting, by an operator, information related to at least one word of said sentence, said information defining the part of speech of said word selected by the operator based on the context of said sentence;
   means for translating said sentence into said second language, said means for translating utilizing said information in performing said translations;
   means for outputting a sentence in said second language corresponding in meaning to said sentence to be translated, in response to a completed translation by said means for translating; and display means for displaying said input information; and means for determining whether said input information has been accepted or corrected by a user, said means for translating performing said translation in response to a determination by said determining means.

8. A translation system for translating sentences from a first language into a different second language, comprising:

means for inputting and displaying a sentence to be translated;

means for manually inputting, by an operator, information related to at least one word of said sentence, said information defining the part of speech of said word selected by the operator based on the context of said sentence;

means for translating said sentence into said second language, said means for translating utilizing said information in performing said translations;

means for outputting a sentence in said second language corresponding in meaning to said sentence to be translated, in response to a completed translation by said means for translating; and means for displaying said part of speech adjacent to a specific word of the sentence.

* * * * *